United States Patent
Wu et al.

(10) Patent No.: US 9,496,570 B2
(45) Date of Patent: Nov. 15, 2016

(54) APPARATUS FOR CONTROLLING FUEL CELL HEATING VALUE

(71) Applicant: SK Innovation Co., Ltd., Seoul (KR)

(72) Inventors: Seong Je Wu, Daejeon (KR); Kyung Bin Yoo, Daejeon (KR); Young Dae Kim, Daejeon (KR)

(73) Assignee: SK INNOVATION CO., LTD., Seoul (KR)

( * ) Notice: Subject to any disclaimer, the term of this patent is extended or adjusted under 35 U.S.C. 154(b) by 379 days.

(21) Appl. No.: 14/277,208

(22) Filed: May 14, 2014

(65) Prior Publication Data

US 2015/0188167 A1 Jul. 2, 2015

(30) Foreign Application Priority Data

Dec. 27, 2013 (KR) .................. 10-2013-0165615

(51) Int. Cl.
*H01M 8/04* (2016.01)
*H01M 8/24* (2016.01)

(52) U.S. Cl.
CPC ..... *H01M 8/04365* (2013.01); *H01M 8/0007* (2013.01); *H01M 8/0494* (2013.01); *H01M 8/04559* (2013.01); *H01M 8/04589* (2013.01); *H01M 8/04619* (2013.01); *H01M 8/04679* (2013.01); *H01M 8/04701* (2013.01); *H01M 8/04731* (2013.01); *H01M 8/2465* (2013.01); *Y02E 60/50* (2013.01)

(58) Field of Classification Search
CPC .................. H01M 8/04007; H01M 8/04365; H01M 8/04559; H01M 8/04589; H01M 8/04619; H01M 8/04679; H01M 8/04701; H01M 8/04731; H01M 8/0494; H01M 8/2465; Y02E 60/50

See application file for complete search history.

(56) References Cited

U.S. PATENT DOCUMENTS

| 2006/0127710 A1 | 6/2006 | Schulte |
| 2006/0257696 A1 | 11/2006 | Sridhar |
| 2013/0059220 A1 | 3/2013 | Kim |

OTHER PUBLICATIONS

Search report for related European Patent Application No. 14169485.1, dated Jun. 1, 2015 (7 pages).

*Primary Examiner* — Brittany Raymond
(74) *Attorney, Agent, or Firm* — Abelman, Frayne & Schwab

(57) ABSTRACT

Disclosed herein is an apparatus for controlling a fuel cell heating value. The apparatus includes stack condition sensors which senses conditions of respective fuel cell stacks, and a control unit. Based on conditions of the fuel cell stacks sensed by the stack condition sensors, when at least one conditioning target stack having a heating value that is out of a preset heating value threshold range is sensed, the control unit forms a conditioning target stack group including the sensed at least one conditioning target stack or at least two conditioning target stack groups including the sensed at least one conditioning target stack and connects each of the conditioning target stack groups to at least one of at least two heating value conditioning units.

13 Claims, 8 Drawing Sheets

APPARATUS FOR CONTROLLING FUEL CELL HEATING VALUE

CROSS REFERENCE TO RELATED APPLICATION

This application claims the benefit of Korean Patent Application No. 10-2013-0165615, filed on Dec. 27, 2013, entitled "DEVICE AND METHOD FOR CONTROLLING FUEL CELL HEATING VALUE", which is hereby incorporated by reference in its entirety into this application.

BACKGROUND OF THE INVENTION

1. Technical Field

The present invention relates generally to fuel cell systems and, more particularly, to an apparatus and method for controlling a heating value of a fuel cell including a plurality of fuel cell stacks.

2. Description of the Related Art

Producing electricity and heat from fuel, fuel cells are configured in such a way that a plurality of fuel cell stacks is connected to each other to increase the capacity. Mechanically connected to each other, and receiving fuel, air and additives for thermochemical reactions, fuel cell stacks or stack modules, each of which includes a plurality of fuel cell stacks, are stacked on top of one another in a unit of several tens to hundreds so as to obtain a desired amount of electric power output.

However, if stacks or stack modules deteriorate at different rates, a deviation in the performance between the stacks or stack modules is caused as operating time passes. Furthermore, when the efficiency of some stacks is lowered due to abnormal acceleration of deterioration, a deviation in the performance between the stacks or stack modules is also induced. Alternatively, the stacks or stack modules may not be uniform in performance from production, so that a performance deviation may be present from beginning of operation.

Moreover, when a performance deviation occurs, heating values of the stacks or stack modules differ from each other, and a deviation in temperature of the stacks or stack modules is also caused. Typically, the above-mentioned construction of the stacks or stack modules is characterized in that the temperature of a stack that has a comparatively low heating value is further reduced compared to a stack that has a high heating value, as will be described below. This results in an additional change in performance of the stacks or stack modules. When such a phenomenon worsens and reaches a specific point, some stacks or stack modules are out of operation limiting conditions such as operable stack temperature or voltage. Ultimately, a shut down phenomenon is caused.

Such a phenomenon will be described with reference to FIGS. 1A through 2B.

FIG. 1A is a view illustrating deterioration spreading influence between fuel cell stacks that are connected in parallel to each other. FIG. 1B is a graph showing the voltage and current of the fuel cell stacks to illustrate the deterioration spreading influence between the fuel cell stacks that are connected in parallel to each other. This example shows an operation mode which produces constant power regardless of deterioration of a stack.

As shown in FIGS. 1A and 1B, in a fuel cell system (normal performance of [1]) in which fuel cell stacks are electrically connected in parallel to each other, if one stack temporarily deteriorates due to an impact or environmental changes (state 2 of [2]—one stack deteriorated), the deteriorated stack is changed from state 2 to state 3 after a predetermined time has passed. The normal stack, the operating point of which has been changed to state 3', has a higher heating value than that of the deteriorated stack.

The reason why the heating value of the normal stack is higher than that of the deteriorated stack is due to the fact that while a voltage loss ($\Delta V$) which is a voltage difference between an open circuit voltage (OCV) or Nernst potential of the normal stack or the deteriorated stack that is measured at an initial stage and a present voltage of the stack is the same, the operating current of the normal stack becomes higher than that of the deteriorated stack. As shown in FIG. 1B, the OCV is 79 V.

In detail, referring to FIG. 1B, it can be understood that when the normal stack and the deteriorated stack are respectively present in states 3' and 3 (primary deterioration spreading at [3]), the voltage loss ($\Delta V$) is the same between the normal stack and the deteriorated stack, but because the operating current of the normal stack is higher than that of the deteriorated stack, the heating value of the normal stack is greater than that of the deteriorated stack (heating value=voltage loss×present operating current).

That is, when the normal stack and the deteriorated state are in current states 3' and 3, the heating value of the normal stack is a voltage loss (79−63=16 V)×24 A, and the heating value of the deteriorated stack is 16 V×17 A. As such, the heating value of the normal stack becomes greater than that of the deteriorated stack. In this case, because of a lower heating value of the deteriorated stack than that of the normal stack, the temperature (730° C. of state 3) of the deteriorated stack is reduced compared to that of state 2 (750° C.).

Thereafter, a fuel cell system including the stacks or stack modules requires a larger amount of cooling fluid to reduce the temperature of the normal stack that has been heated. The cooling fluid further reduces the temperature of the deteriorated stack which is mechanically connected to the normal stack. As the temperature of the deteriorated stack is reduced, the resistance thereof increases. Thereby, the voltage of the deteriorated stack is further reduced, thus causing a phenomenon of current being concentrated on the normal stack. The current concentration phenomenon continues until almost the same power as the initial power is obtained. Ultimately, a difference in operating current between the normal stack and the deteriorated stack is further increased (in FIGS. 1A and 1B, states 3' and 3 are changed to states 4' and 4, secondary deterioration spreading at [4]). Here, as shown in FIG. 1A, the initial power is 65 V×40 A (20 A+20 A), and a present power becomes 60 V×43 A (15 A+28 A).

As time passes, if such a phenomenon continues, the temperature of the deteriorated stack is further reduced, or the operating voltage thereof is reduced below the minimum reference value. As a result, the stacks, the stack modules and the fuel cell system including them may be shut down.

FIG. 2A is a view illustrating deterioration spreading influence between fuel cell stacks that are connected in series to each other. FIG. 2B is a graph showing the voltage and current of the fuel cell stacks to illustrate the deterioration spreading influence between the fuel cell stacks that are connected in series to each other. This example shows an operation mode which produces constant power regardless of deterioration of a stack.

As shown in FIGS. 2A and 2B, in a fuel cell system (normal performance of [1]) in which fuel cell stacks are electrically connected in series to each other, if one stack temporarily deteriorates due to an impact or environmental changes (state 2 of [2]—one stack deteriorated), the current of the deteriorated stack is the same as that of the normal stack, but the voltage of the deteriorated stack becomes different from that of the normal stack depending on resistances of the stacks, because the stacks are connected in series to each other.

Referring to a state of [2] of FIG. 2A and FIG. 2B, the operating current of the deteriorated stack is the same as that of the normal stack, but a voltage loss ($\Delta V$) of the deteriorated stack is greater than that of the normal stack. Therefore, it can be appreciated that the heating value of the deteriorated stack is greater than that of the normal stack. Because of the increased heating value of the deteriorated stack, the temperature of the deteriorated stack is increased. To reduce the temperature of the deteriorated stack that has been heated, a larger amount of cooling fluid is required. The cooling fluid further reduces the temperature of the normal stack which is mechanically connected to the deteriorated stack, whereby the resistance of the normal stack is increased. Thus, the performance curve of the normal stack is decreased (primary deterioration spreading at [3]). Therefore, to obtain the same power, the operating current is further increased, resulting in an increase in the heating value of the deteriorated stack. As the heating value of the deteriorated stack is increased, additional cooling fluid is supplied. As a result, the temperature of the normal stack is further reduced so that the performance curve of the normal stack is further decreased (the operating point is changed from state 3' to state 4').

As time passes, if such a phenomenon continues, the temperature of the normal stack is further reduced, or the operating voltage thereof is reduced below the minimum reference value. Ultimately, the stacks, the stack modules and the fuel cell apparatus including them may be completely shut down.

To solve the above problems, an apparatus and method for controlling a heating value of a fuel cell is required, which can control the heating value of an abnormal stack or stack module before a shut down phenomenon occurs, and which allows a user to arbitrarily control the heating value of the stack or stack module to achieve a particular purpose.

SUMMARY OF THE INVENTION

The present invention has been made in an effort to provide an apparatus and method for controlling a fuel cell heating value which electrically connects fuel cell stacks or fuel cell stack modules to each other and minimizes a deviation between heating values of the fuel cell stacks or fuel cell stack modules, thus preventing acceleration of stack deterioration, rapid stack performance degradation, and a shut down phenomenon, thereby making it possible to reliably and efficiently operate the stacks or stack modules, and which is configured such that the heating values of the stacks or stack modules can be controlled arbitrarily by a user, thus providing stacks or stack modules designed for user's convenience.

In an embodiment, the present invention provides an apparatus for controlling a heating value of a fuel cell having a plurality of fuel cell stacks mechanically connected to each other, the apparatus comprises a plurality of stack condition sensors, and a control unit. A plurality of stack condition sensors sense conditions of the respective fuel cell stacks. The control unit is configured such that, based on conditions of the fuel cell stacks sensed by the stack condition sensors, when at least one conditioning target stack having a heating value that is out of a preset heating value threshold range is sensed, at least one conditioning target stack group including the sensed at least one conditioning target stack is formed, and the at least one conditioning target stack group is connected to the corresponding heating value conditioning unit of at least two heating value conditioning units.

The control unit may control the heating value conditioning units so that the heating value conditioning unit connected to the conditioning target stack group adjusts a heating value of the corresponding conditioning target stack group such that the heating value of the conditioning target stack group is within the preset heating value threshold range.

The apparatus may further include a switching unit connecting at least some of the fuel cell stacks to each other and connecting the connected fuel cell stacks to at least one of the at least two heating value conditioning units. The switching unit may include: a fuel-cell-stack switching unit forming, through on/off operation thereof, the at least one conditioning target stack group including the at least one conditioning target stack; and a heating-value-conditioning-unit switching unit connecting the at least one conditioning target stack group to the corresponding heating value conditioning unit of the at least two heating value conditioning units.

Based on conditions of the sensed stacks, when the control unit senses a conditioning target stack having a heating value higher than the preset heating value threshold range, the control unit may form at least one conditioning target stack group including the sensed at least one conditioning target stack, connect the conditioning target stack group to a first heating value conditioning unit of the at least two heating value conditioning units, and control the connected first heating value conditioning unit using a first control signal of the control unit so that the first heating value conditioning unit conducts a first conditioning operation in repose to the first control signal such that the heating value of the conditioning target stack group reduces and enters the preset heating value threshold range. Based on the conditions of the sensed stacks, when the control unit senses a conditioning target stack having a heating value lower than the preset heating value threshold range, the control unit form at least one conditioning target stack group including the sensed at least one conditioning target stack, connect the conditioning target stack group to a second heating value conditioning unit of the at least two heating value conditioning units, and control the connected second heating value conditioning unit using a second control signal of the control unit so that the second heating value conditioning unit conducts a second conditioning operation in repose to the second control signal such that the heating value of the conditioning target stack group increases and enters the preset heating value threshold range.

The control unit may control the first and second heating value conditioning units such that the first and second heating value conditioning units respectively conduct the first and second conditioning operations at a same time.

The control unit may control the first and second heating value conditioning units such that the first and second heating value conditioning units respectively conduct the first and second conditioning operations at different times.

The heating value conditioning unit may control current of the conditioning target stack.

The heating value of the conditioning target stack may satisfy a following equation: a heating value=$I \times \Delta V$, using a present operating current (I) and a voltage loss ($\Delta V$), the voltage loss ($\Delta V$) being a voltage difference between an open circuit voltage (OCV) or Nernst potential of the conditioning target stack that is measured at an initial stage and a present voltage of the conditioning target stack, or the heating value of the conditioning target stack may be measured and calculated from a temperature of the conditioning target stack that is sensed by the corresponding stack condition sensor.

Each of the stack condition sensors may sense at least one of a current, a voltage and a temperature of the corresponding fuel cell stack and transmits the sensed at least one of the current, the voltage and the temperature to the control unit. The control unit may sense the conditioning target stack based on the sensed at least one of the current, the voltage and the temperature.

In another embodiment, the present invention provides an apparatus for controlling a heating value of a fuel cell having a plurality of fuel cell stack modules mechanically connected to each other, each of the fuel cell stack modules including at least one fuel cell stack receiving fuel and air, the apparatus comprises a plurality of stack module condition sensors and a control unit. A plurality of stack module condition sensors sense conditions of the respective fuel cell stack modules. The control unit is configured such that, based on conditions of the fuel cell stack modules sensed by the stack module condition sensors, when at least one conditioning target stack module having a heating value that is out of a preset heating value threshold range is sensed, at least one conditioning target stack module group including the sensed at least one conditioning target stack module is formed, and the at least one conditioning target stack module group is connected to the corresponding heating value conditioning unit of at least two heating value conditioning units.

The control unit may control the heating value conditioning units so that the heating value conditioning unit connected to the conditioning target stack module group adjusts a heating value of the corresponding conditioning target stack module group such that the heating value of the conditioning target stack module group is within the preset heating value threshold range.

The apparatus may further include a switching module unit connecting at least some of the fuel cell stack modules to each other and connecting the connected fuel cell stack modules to at least one of the at least two heating value conditioning units. The switching module unit may include: a fuel-cell-stack switching module unit forming, through on/off operation thereof, the at least one conditioning target stack module group including the at least one conditioning target stack module; and a heating-value-conditioning-unit switching module unit connecting the at least one conditioning target stack module group to the corresponding heating value conditioning unit of the at least two heating value conditioning units.

Each of the stack module condition sensors may sense at least one of a current, a voltage and a temperature of the corresponding fuel cell stack module and transmit the sensed at least one of the current, the voltage and the temperature to the control unit. The control unit may sense the conditioning target stack module based on the sensed at least one of the current, the voltage and the temperature.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1A:
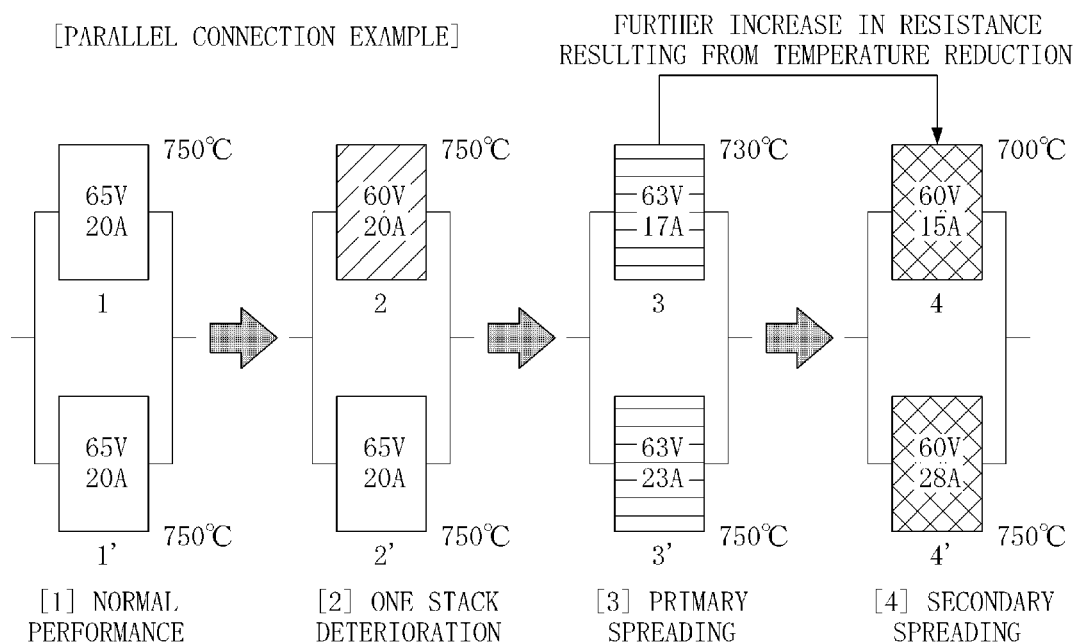
FIG. 1A is a view illustrating deterioration spreading influence between fuel cell stacks that are connected in parallel to each other.
Figure 1B:
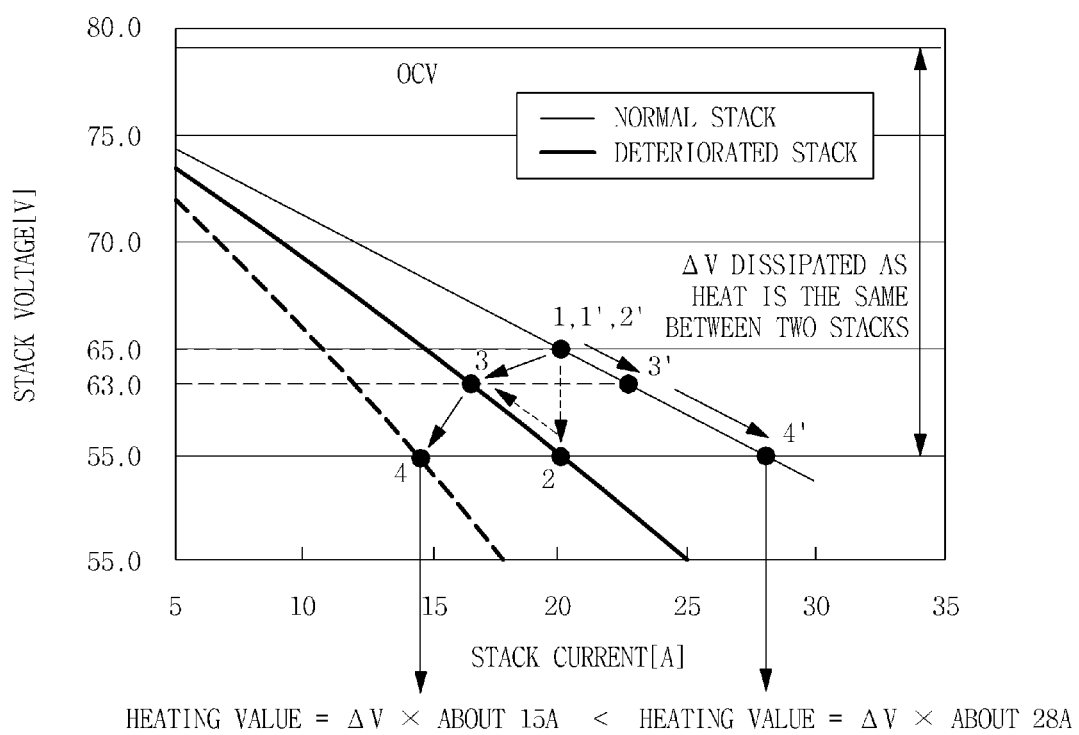
FIG. 1B is a graph showing the voltage and current of the fuel cell stacks to illustrate the deterioration spreading influence between the fuel cell stacks that are connected in parallel to each other.
Figure 2A:
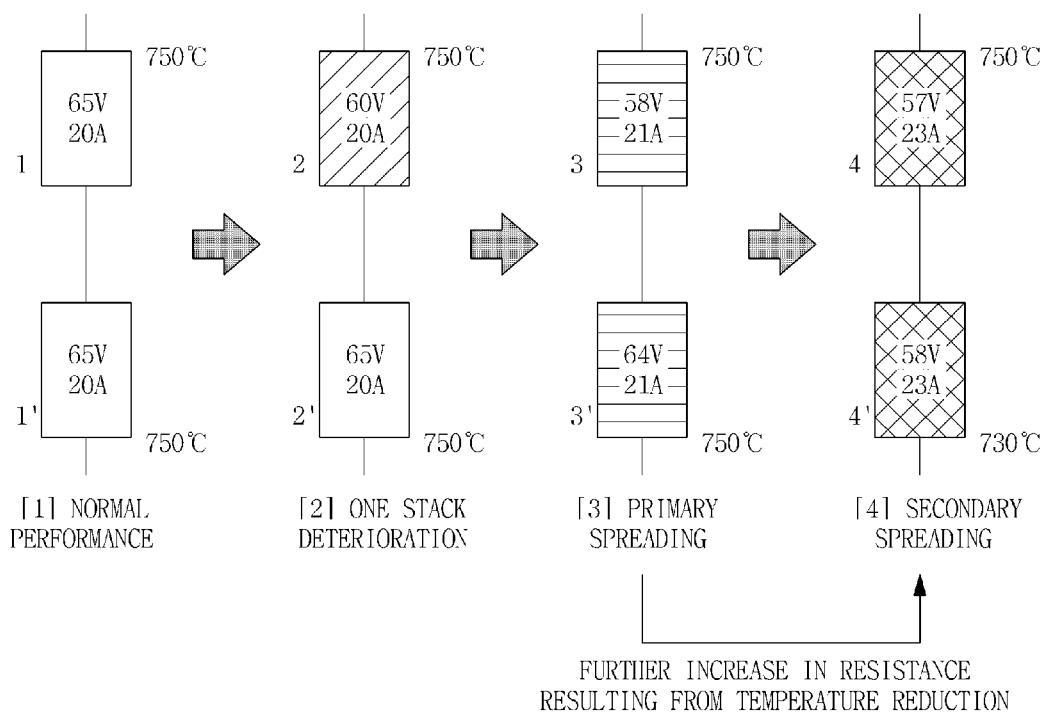
FIG. 2A is a view illustrating deterioration spreading influence between fuel cell stacks that are connected in series to each other.
Figure 2B:
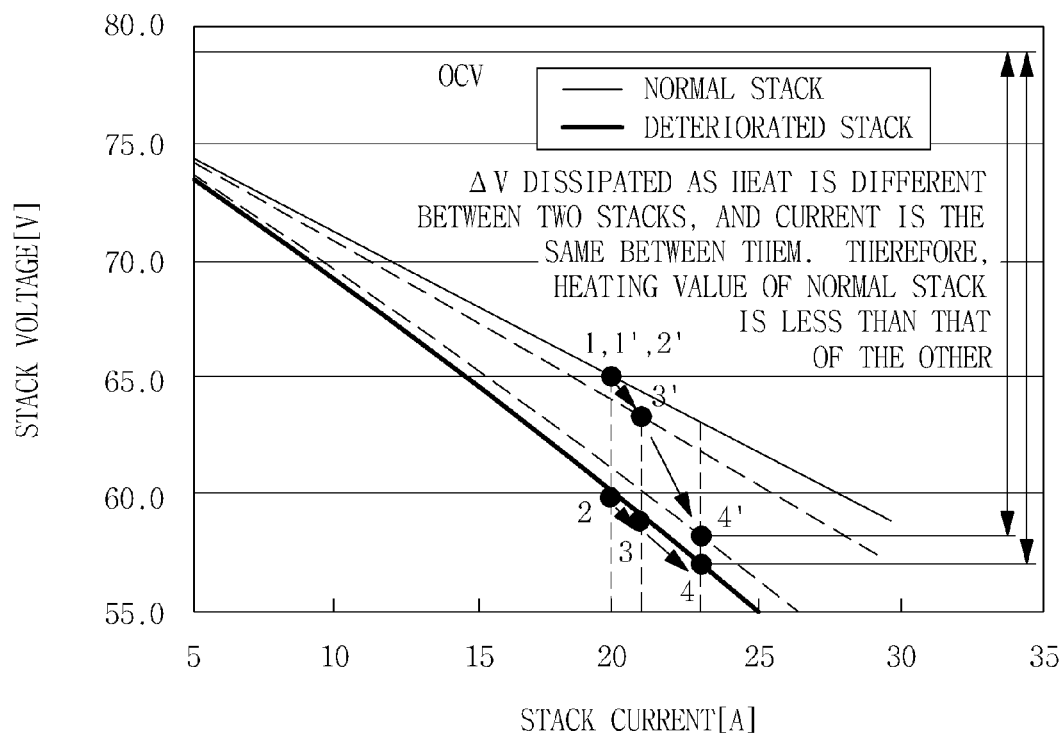
FIG. 2B is a graph showing the voltage and current of the fuel cell stacks to illustrate the deterioration spreading influence between the fuel cell stacks that are connected in series to each other.

The objects, features and advantages of the present invention will be more clearly understood from the following detailed description of the preferred embodiments taken in conjunction with the accompanying drawings. Throughout the accompanying drawings, the same reference numerals are used to designate the same or similar components, and redundant descriptions thereof are omitted. Further, in the following description, the terms "first", "second", "one side", "the other side" and the like are used to differentiate a certain component from other components, but the configuration of such components should not be construed to be limited by the terms. Further, in the description of the present invention, when it is determined that the detailed description of the related art would obscure the gist of the present invention, the description thereof will be omitted.

Hereinafter, embodiments of the present invention will be described in detail with reference to the attached drawings.

Figure 3A:
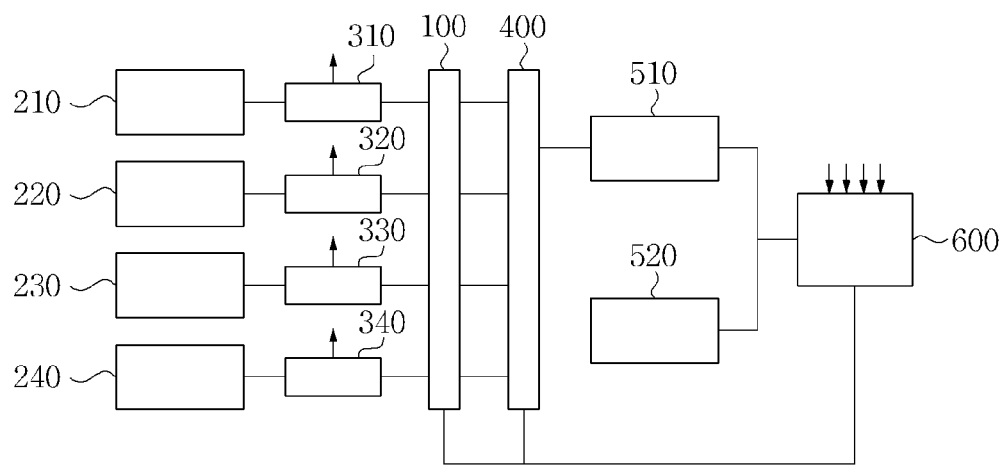
FIGS. 3A, 3B and 3C are block diagrams illustrating the operation of an apparatus for controlling a heating value of a fuel cell, when one stack among normal stacks deteriorates, according to an embodiment of the present invention.
Figure 3B:
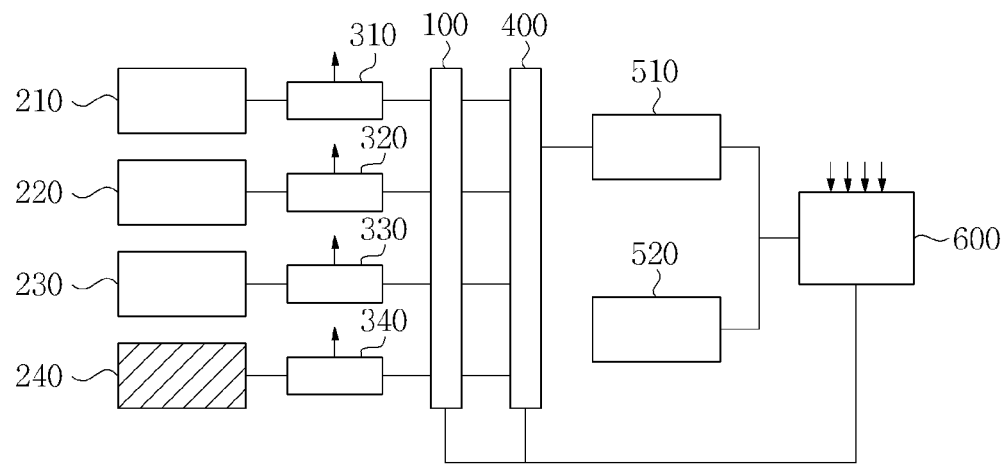
Figure 3C:
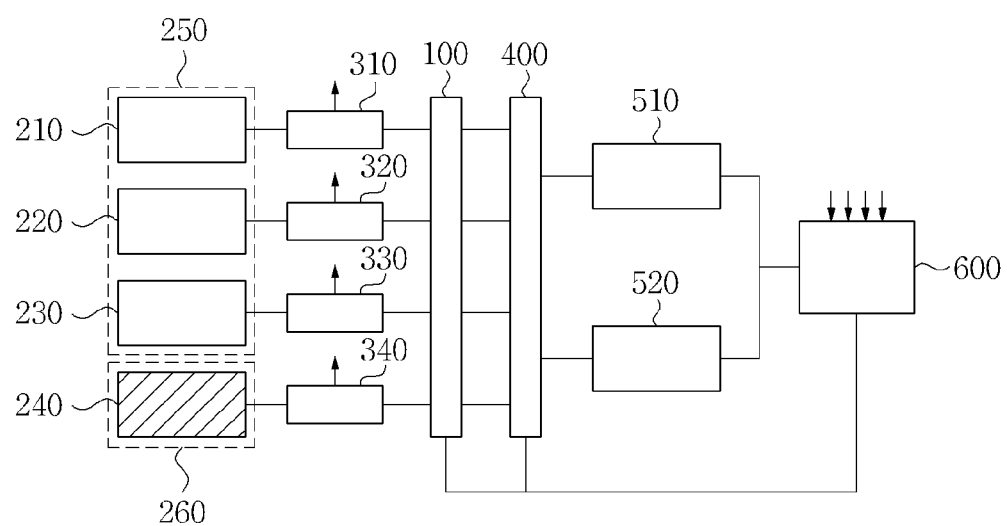
Figure 4A:
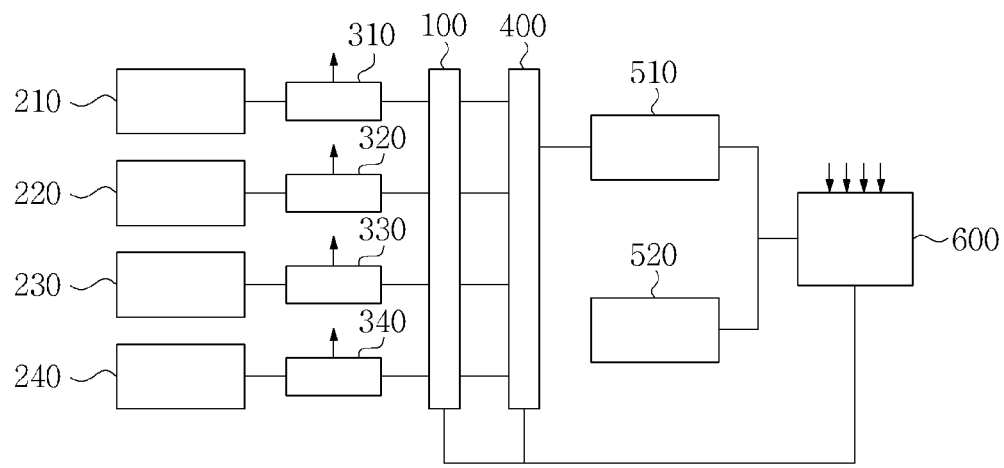
FIGS. 4A, 4B and 4C are block diagrams illustrating the operation of the heating value control apparatus, when two stacks among normal stacks deteriorate, according to another embodiment of the present invention.
Figure 4B:
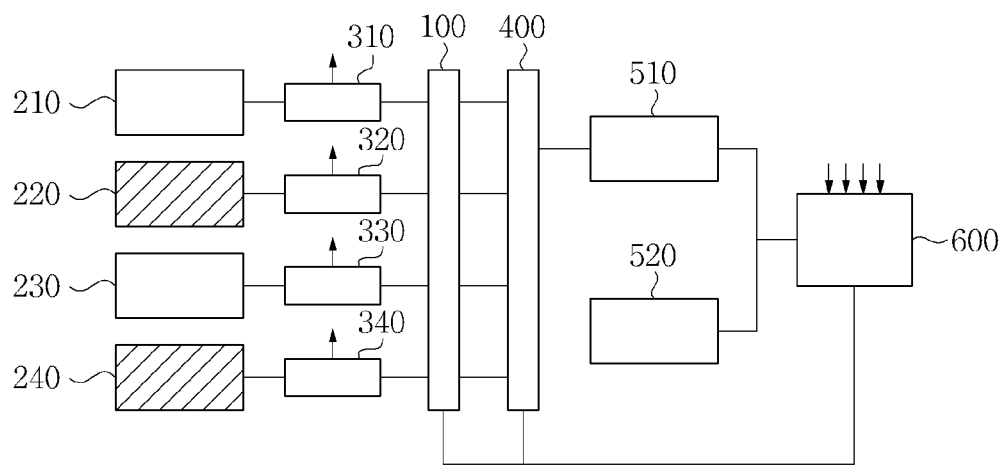
Figure 4C:
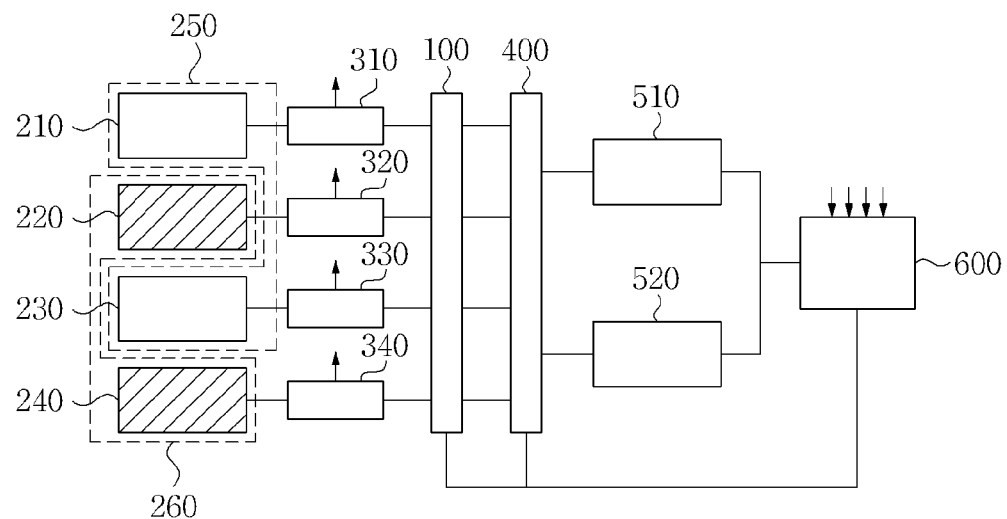

FIGS. 3A, 3B and 3C are block diagrams illustrating the operation of an apparatus for controlling a heating value of a fuel cell, when one stack among normal stacks deteriorates, according to an embodiment of the present invention. FIGS. 4A, 4B and 4C are block diagrams illustrating the operation of the heating value control apparatus, when two stacks among normal stacks deteriorate, according to another embodiment of the present invention.

Preceding the description of the operation of the heating value control apparatus, the components of the apparatus and the functions of the components will be explained with reference to FIGS. 3A through 4C.

Components of the Heating Value Control Apparatus and Functions of the Components Referring to FIGS. 3A through 4C, the heating value control apparatus includes a plurality of stack condition sensors 310, 320, 330 and 340 which respectively sense conditions of a plurality of fuel cell stacks 210, 220, 230 and 240, and switching units 100 and 400 which electrically connect at least some of the fuel cell stacks 210, 220, 230 and 240, for example, in series, parallel or series-parallel to each other, and connect the connected fuel cell stacks to one of at least two heating value conditioning units 510 and 520. The fuel cell stacks 210, 220, 230 and 240 involved with the heating value control apparatus are mechanically connected to each other so that fuel and air can be supplied to the fuel cell stacks 210, 220, 230 and 240. Each heating value conditioning unit may be, for example, a PCS (power conditioning system).

In the following description, the tem "electrically connecting" or "electrically connected" refers to that components can be connected in series, parallel or series-parallel to each other, unless specifically mentioned otherwise.

The switching unit 100 is a switching unit for the fuel cell stacks which forms, through on/off operation thereof, at least one conditioning target stack group including at least some of the fuel cell stacks, for example, at least one conditioning target stack to be conditioned in the heating value. The switching unit 400 is a switching unit for the heating value conditioning units which connects the at least one conditioning target stack group, which have been formed by the switching unit 100, to the corresponding heating value conditioning unit of the at least two heating value conditioning units.

Although, for instance, each of the switching unit 100 and the switching unit 400 may include a switching device which has two or three switching terminals, it is not limited to this. In other words, each of the switching units 100 and 400 may include another type of switching device (e.g., a diode, a FET, a transistor or a combination of them) which is appropriately configured according to a design of a user, so long as it can conduct the same function.

The heating value control apparatus further includes a control unit 600 which controls the on-off operation of the switching units 100 and 400, receives sensing signals of the stack condition sensors 310, 320, 330 and 340, and controls the heating values of the at least two heating value conditioning units 510 and 520. The stack condition sensors 310, 320, 330 and 340 are respectively connected to the fuel cell stacks 210, 220, 230 and 240 so that when a change occurs in the fuel cell stacks 210, 220, 230 and 240, in other words, the heating value of at least one fuel cell stack is out of a preset heating value threshold range, each of the stack condition sensors 310, 320, 330 and 340 senses at least one of a current, a voltage and a temperature of the corresponding fuel cell stack and transmits it to the control unit 600 as a sensing signal.

For example, each stack condition sensor 310, 320, 330, 340 may become at least one temperature measurement point, such as a temperature measurement point at a fuel or air outlet of the stack or a temperature measurement point at a central portion of the stack, at which the temperature of the stack can be measured. The heat generation degree or heating value of each stack can be determined by a temperature measured at the temperature measurement point.

Furthermore, each stack condition sensor 310, 320, 330, 340 may include a shunt resistor or hall sensor which senses flowing current.

The preset heating value threshold range is determined by an input value that is previously input, and the input value is stored in a memory (not shown) which is provided in the control unit. Although the input value refers to a purposed specific value, for example, a heating value measurement statistic, a heating value experimental value, a heating value estimated value, etc., it is not limited to these, and any value defined by the user can be used as the input value. Therefore, the preset heating value threshold range depends on the input value stored in the memory of the control unit. In this specification, although the preset heating value threshold range has been illustrated as being stored in the memory of the control unit, the present invention is not limited to this. For example, the preset heating value threshold range may be stored in a separate memory installed outside the control unit.

The control unit 600 uses sensing signals of the stack condition sensors 310, 320, 330 and 340 and determines whether at least one conditioning target stack to be conditioned in the heating value is present or not. If at least one conditioning target stack to be conditioned in the heating value is sensed, the control unit 600 controls the on/off operation of the switching unit 100 for fuel cell stacks, and forms to allow at least one conditioning target stack group to include the sensed at least one conditioning target stack. In other words, the control unit 600 can control the operation of the switching unit 100 to form the conditioning target stack group.

The control unit 600 also uses the switching unit 400 to connect the at least one conditioning target stack group to the corresponding heating value conditioning unit of the at least two heating value conditioning units.

The at least two heating value conditioning units 510 and 520 control the heating values of the conditioning target stacks in response to a control signal of the control unit 600, for example, are able to adjust one or both of current or voltage to control the heating values of the conditioning target stacks.

In other words, the control unit 600 controls the corresponding heating value conditioning unit such that the heating value conditioning unit to which the conditioning target stack group is connected by the switching unit 400 adjusts the heating values of the conditioning target stacks to fall the heating values within the preset heating value threshold range. That is, a control signal of the control unit 600 is transmitted to the heating value conditioning unit. In response to this, the heating value conditioning unit (to which the conditioning target stack group is connected) adjusts the heating value of the conditioning target stack group such that it is within the preset heating value threshold range.

For example, based on conditions of the stacks that are sensed by the stack condition sensors, that is, based on sensing signals of the stack condition sensors, when the control unit 600 senses a at least one conditioning target stack the heating value of which is higher than the heating value threshold range, the control unit 600 controls the operation of the switching units 100 and 400, forms at least one conditioning target stack group including the sensed conditioning target stack, and subsequently, the control unit 600 connects the conditioning target stack group to a first heating value conditioning unit of the at least two heating value conditioning units and controls the connected first heating value conditioning unit using a first control signal of the control unit so that the first heating value conditioning unit conducts a first conditioning operation in repose to the first control signal such that the heating value of the conditioning target stack group is reduced and enters the preset heating value threshold range.

Furthermore, based on conditions of the stacks that are sensed by the stack condition sensors, that is, based on sensing signals of the stack condition sensors, when the control unit 600 senses at least one conditioning target stack the heating value of which is lower than heating value threshold range, the control unit 600 controls the operation of the switching units 100 and 400, thereby forming at least one conditioning target stack group including the sensed conditioning target stack, and subsequently, connecting the conditioning target stack group to a second heating value conditioning unit of the at least two heating value conditioning units and controls the connected second heating value conditioning unit using a second control signal of the control unit so that the second heating value conditioning unit conducts a second conditioning operation in repose to the second control signal such that the heating value of the conditioning target stack group is increased and enters the preset heating value threshold range.

The control unit 600 may control the first and second heating value conditioning units such that the first conditioning operation and the second conditioning operation are conducted at the same time. Alternatively, the control unit 600 may control the first and second heating value conditioning units such that the first conditioning operation is conducted before the second heating value conditioning unit is, or the second heating value conditioning unit is conducted before the first conditioning operation is.

Hereinafter, a method of controlling, by the heating value control apparatus, the heating values of the stacks will be described in detail with reference to an example.

The Method of Controlling the Heating Value Using the Heating Value Control Apparatus Referring to FIGS. 3A through 3C, as shown in FIG. 3A, the heating value control apparatus generally has a plurality of fuel cell stacks. In this embodiment, it assumes that the fuel cell stacks comprise four normal fuel cell stacks 210, 220, 230 and 240 which are connected in parallel to each other. Because the fuel cell stacks 210, 220, 230 and 240 are normal, even if the fuel cell stacks 210, 220, 230 and 240 are electrically connected to each other, thereby connecting the fuel cell stacks connected to each other to only at least one of the two heating value conditioning units, using the switching units 100 and 400, the fuel cell stacks 210, 220, 230 and 240 can conduct the intended function thereof, in other words, the fuel cell stacks 210, 220, 230 and 240 can normally output power. This state will be referred to as state 1 or 1' herein below.

In the heating value control apparatus having the four normal fuel cell stacks, the case where one of the fuel cell stacks is deteriorated by external or internal environmental changes, e.g., an impact applied thereto or a malfunction of the composition of the fuel cell stack, for example, as shown in FIG. 3B, the case where the fuel cell stack 240 deteriorates, will be referred to as state 2 or 2'.

In this case, because the heating value of each of the normal fuel cell stacks 210, 220 and 230 is greater than that of the deteriorated fuel cell stack 240 (when the fuel cell stacks are connected in parallel to each other and one of the fuel cell stacks deteriorates, the heating value of each normal fuel cell stack is greater than that of the deteriorated fuel cell stack—refer to the above description of the shut-down phenomenon), the control unit 600 reduces the heating value of the normal fuel cell stacks 210, 220 and 230 and increases the heating value of the deteriorated fuel cell stack 240 so that the heating values can become a desired heating value.

On the basis of the preset (desired) heating value threshold range, to show the case where the heating values of the fuel cell stacks 210, 220, 230 and 240 converge on the preset heating value threshold range, that is, as illustrated by the arrows below, to show the case where the heating value of the deteriorated fuel cell stack 240 and the heating value of the normal fuel cell stacks 210, 220 and 230 converge on the heating value threshold range, it is assumed that the preset heating value threshold range is lower than the heating value of the normal fuel cell stacks 210, 220 and 230 and higher than the heating value of the deteriorated fuel cell stack 240.

the heating value of the deteriorated fuel cell stack→the preset heating value threshold range←the heating value of the normal deteriorated fuel cell stack Referring to this, as shown in FIG. 3C, the control unit 600 controls the on-off operation of the switching units 100 and 400, thereby forming at least one normal fuel cell stack group 250 including the normal fuel cell stacks 210, 220 and 230, and subsequently, connecting the normal fuel cell stack group 250 to the first heating value conditioning unit 510 of the at least two heating value conditioning units 510 and 520 and controls the connected first heating value conditioning unit 510 using a first control signal of the control unit 600 so that the first heating value conditioning unit 510 conducts a first conditioning operation in repose to the first control signal such that the heating value of the normal fuel cell stack group 250 is reduced and enters the preset heating value threshold range.

Furthermore, the control unit 600 controls the on-off operation of the switching units 100 and 400 for fuel cell stacks, thereby forming at least one deteriorated fuel cell stack group 260 including the deteriorated fuel cell stack 240, and subsequently, connecting the deteriorated fuel cell stack group 260 to the second heating value conditioning unit 520 of the at least two heating value conditioning units 510 and 520 and controls the connected second heating value conditioning unit 520 using a second control signal of the control unit 600 so that the second heating value conditioning unit 520 conducts a second conditioning operation in repose to the second control signal such that the heating value of the deteriorated fuel cell stack group 260 is increased and enters the preset heating value threshold range.

As stated above, the control unit 600 may control the first and second heating value conditioning units 510 and 520 such that the first conditioning operation and the second conditioning operation are conducted at the same time. Alternatively, the control unit 600 may control the first and second heating value conditioning units 510 and 520 such that the first conditioning operation is conducted before the second heating value conditioning unit is, or the second heating value conditioning unit is conducted before the first conditioning operation is. This case will be referred to as state 3 or 3' below.

As such, the control unit 600 controls the apparatus such that the first and second heating value conditioning units 510 and 520 conduct the first conditioning operation and the second conditioning operation, whereby a difference between the heating values of the fuel cell stacks can be minimized.

FIGS. 4A, 4B and 4C are block diagrams illustrating the operation of the heating value control apparatus, when two stacks among normal stacks deteriorate, according to an embodiment of the present invention. The general construction and operation of this embodiment, other than the fact that only the number of deteriorated fuel cell stacks is increased from one to two and the number of normal fuel cell stacks is reduced from three to two, are the same as those of the embodiment of FIGS. 3A, 3B and 3C. In other words, in the embodiment of FIGS. 4A, 4B and 4C, two normal fuel cell stacks 210 and 230 are present, and two deteriorated fuel cell stacks 220 and 240 are also formed.

Therefore, as shown in FIG. 4C, the control unit 600 forms a normal fuel cell stack group 250 including the two normal fuel cell stacks 210 and 230 and forms a deteriorated fuel cell stack group 260 including two deteriorated fuel cell stacks 220 and 240. The other operation of controlling the heating values of the fuel cell stacks is the same as that of the embodiment of FIGS. 3A, 3B and 3C, and further explanation thereof will be omitted.

As shown in FIGS. 3A through 4C, although the heating value control apparatus according to the embodiment of the present invention has been illustrated as controlling the four fuel cell stacks and the two heating value conditioning units, the present invention is limited to this. For example, when n is an integer of 2 or more, the heating value control apparatus may control electrical connection between n number of stacks including first through n-th fuel cell stacks and n number of heating value conditioning units and control the heating value conditioning operation of n number of heating value conditioning units (not shown).

Furthermore, in FIGS. 3A through 4C, although the electrical connection of each of the fuel cell stacks has been illustrated as being controlled by the control unit 600 and the switching units 100 and 400, the present invention is not limited to this. For instance, the heating value control apparatus may be configured such that at least one fuel cell stack module including at least one fuel cell stack is formed, and electrical connection of the at least one fuel cell stack module is controlled by the control unit 600 and the switching units 100 and 400.

In the heating value control apparatus that includes a plurality of fuel cell stack modules including at least one fuel cell stack, based on conditions of the stack modules that are sensed by a plurality of stack module condition sensors (not shown), when at least one conditioning target stack module the heating value of which is out of the preset heating value threshold range is sensed, the control unit 600 controls the operation of switching module units (not shown) and forms at least one conditioning target stack module group (not shown) including the sensed conditioning target stack module. Subsequently, the control unit 600 connects the conditioning target stack module group to the corresponding heating value conditioning unit of the at least two heating value conditioning units and controls the connected heating value conditioning unit so that the heating value conditioning unit connected to the conditioning target stack module group makes the heating value of the conditioning target stack module group enter the preset heating value threshold range.

The switching module units include a switching module unit for the fuel cell stack modules and a switching module unit for the heating value conditioning units. The switching module unit for the fuel cell stack modules forms, through on/off operation thereof, at least one conditioning target stack module group including at least one conditioning target stack module. The switching module unit for the heating value conditioning units connects the at least one conditioning target stack module group to the corresponding heating value conditioning unit of the at least two heating value conditioning units.

Devices constituting each stack module condition sensor and devices constituting each switching module unit are respectively similar to or equal to those of the stack condition sensor and the switching unit, and further explanation thereof is deemed unnecessary.

Figure 5:
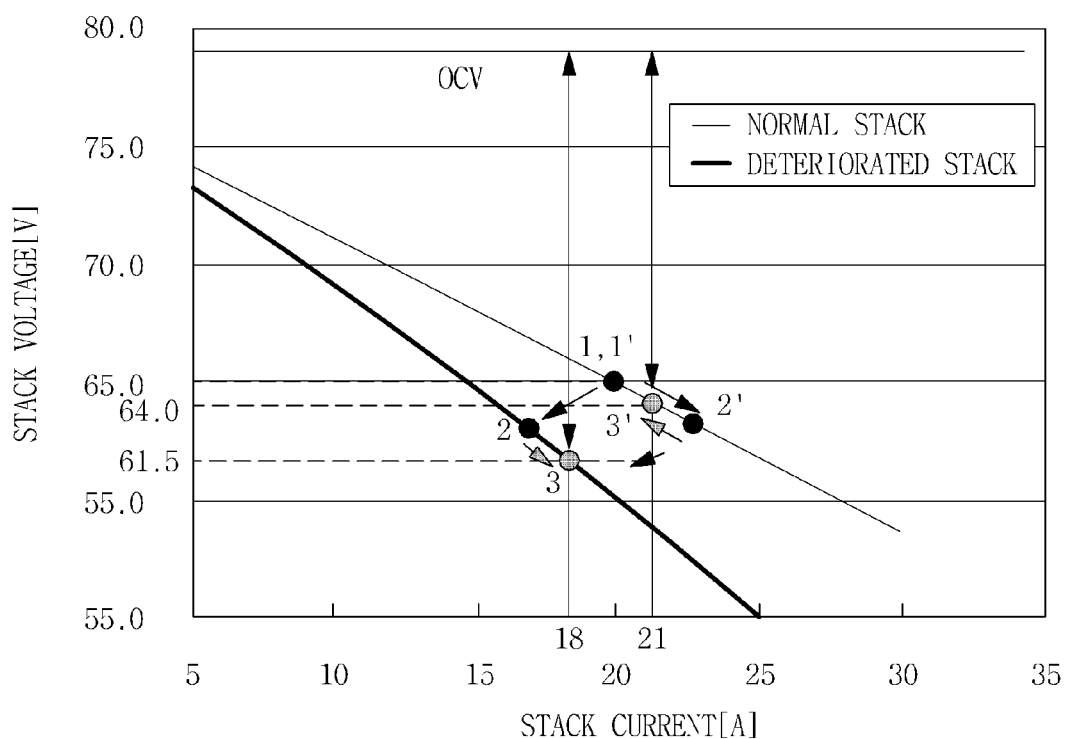
FIG. 5 is a graph showing a process of controlling the heating values of the stacks or stack modules through the operation of the heating value control apparatus when at least one deteriorated stack or stack module occurs as shown in FIG. 3 or 4, according to an embodiment of the present invention.

FIG. 5 is a graph showing a process of controlling the heating values of the fuel cell stacks or fuel cell stack modules through the operation of the heating value control apparatus when at least one deteriorated fuel cell stack or fuel cell stack module occurs from the normal fuel cell stacks or fuel cell stack modules as shown in FIG. 3 or 4, according to an embodiment of the present invention.

Referring to FIG. 5, variation in the states of FIGS. 3 and 4, in other words, variation from state 1 or 1' to state 3 or 3', is as following Table 1.

TABLE 1

| | State | | | | | | | | |
|---|---|---|---|---|---|---|---|---|---|
| | 1 or 1' | | | 2 or 2' | | | 3 or 3' | | |
| Item | Cur. [A] | Volt loss (ΔV) [V] | Heating value of fuel cell stack [W] | Cur. [A] | Volt loss (ΔV) [V] | Heating value of fuel cell stack [W] | Cur. [A] | Volt loss (ΔV) [V] | Heating value of fuel cell stack [W] |
| Normal fuel cell stack (module) | 20 | 14 | 280 | 23 | 16 | 368 | 21 | 15 | 315 |
| Deteriorated fuel cell stack (module) | 20 | 14 | 280 | 17 | 16 | 272 | 18 | 17.5 | 315 |
| Difference between normal and deteriorated fuel cell stacks (modules) | | | 0 | — | — | 96 | — | — | 0 |

Referring to state 2 or 2' of FIG. 5 and Table 1, the heating value of each of the normal fuel cell stack (module) and the deteriorated fuel cell stack (module) that become conditioning target stacks (modules) to be conditioned in the heating value is obtained by the following equation using a present operating current (I) and a voltage loss (ΔV) which is a voltage difference between an open circuit voltage (OCV) or Nernst potential of the conditioning target stack that is measured at an initial stage and a present voltage of the conditioning target stack.

$$\text{Heating value } [W] = I \times \Delta V \qquad (1)$$

A current value (I) and a voltage loss value (ΔV) of state 2 or 2' are applied to the equation 1. The heating value [W] of the normal fuel cell stack (module) is 368 W, and the heating value [W] of the deteriorated fuel cell stack (module) is 272 W. Thus, a difference between the heating values is 96 W, and there is the possibility of a shut down phenomenon. However, the control unit 600 controls the first and second heating value conditioning units 510 and 520 to control the heating values of the stacks, whereby as shown in state 3 or 3' of Table 1, the difference between the heating values becomes 0 W (no heating value difference), that is, can be minimized.

In the above-described example, although the control unit 600 has been illustrated as using the stack condition sensors and calculating the heating values from currents and voltages of the normal fuel cell stack (module) and the deteriorated fuel cell stack (module) to minimize a heating value difference, the present invention is not limited to this. For example, as stated above, even when the stack condition sensors are temperature measurement points, which can measure the temperatures of the normal fuel cell stack (module) and the deteriorated fuel cell stack (module), of course, the control unit 600 can calculate or estimate the heating values of the stacks from the measured temperature values to minimize a heating value difference.

As such, the heating value control apparatus according to the present invention electrically connects fuel cell stacks or fuel cell stack modules to each other and minimizes a deviation between heating values of the fuel cell stacks or fuel cell stack modules, thus preventing acceleration of stack deterioration, rapid stack performance degradation, and a shut down phenomenon. Thereby, the stacks or stack modules can be reliably and efficiently operated.

In FIGS. 3 through 5 with illustration of the normal fuel cell stack and the deteriorated fuel cell stack, although the heating value control apparatus has been illustrated as minimizing a deviation of the heating values between the normal fuel cell stack and the deteriorated fuel cell stack, this is merely exemplary, and the present invention is not limited to this. For instance, the heating value control apparatus may be configured such that a specific desired value is input to the memory of the control unit and is defined as the preset heating value threshold range, and heating value control is conducted in response to the intended purpose of the user, for example, the heating values of the stacks may be intentionally increased or reduced rather than a heating value difference being minimized.

The Heating Value Control Method of the Control Unit

Figure 6:
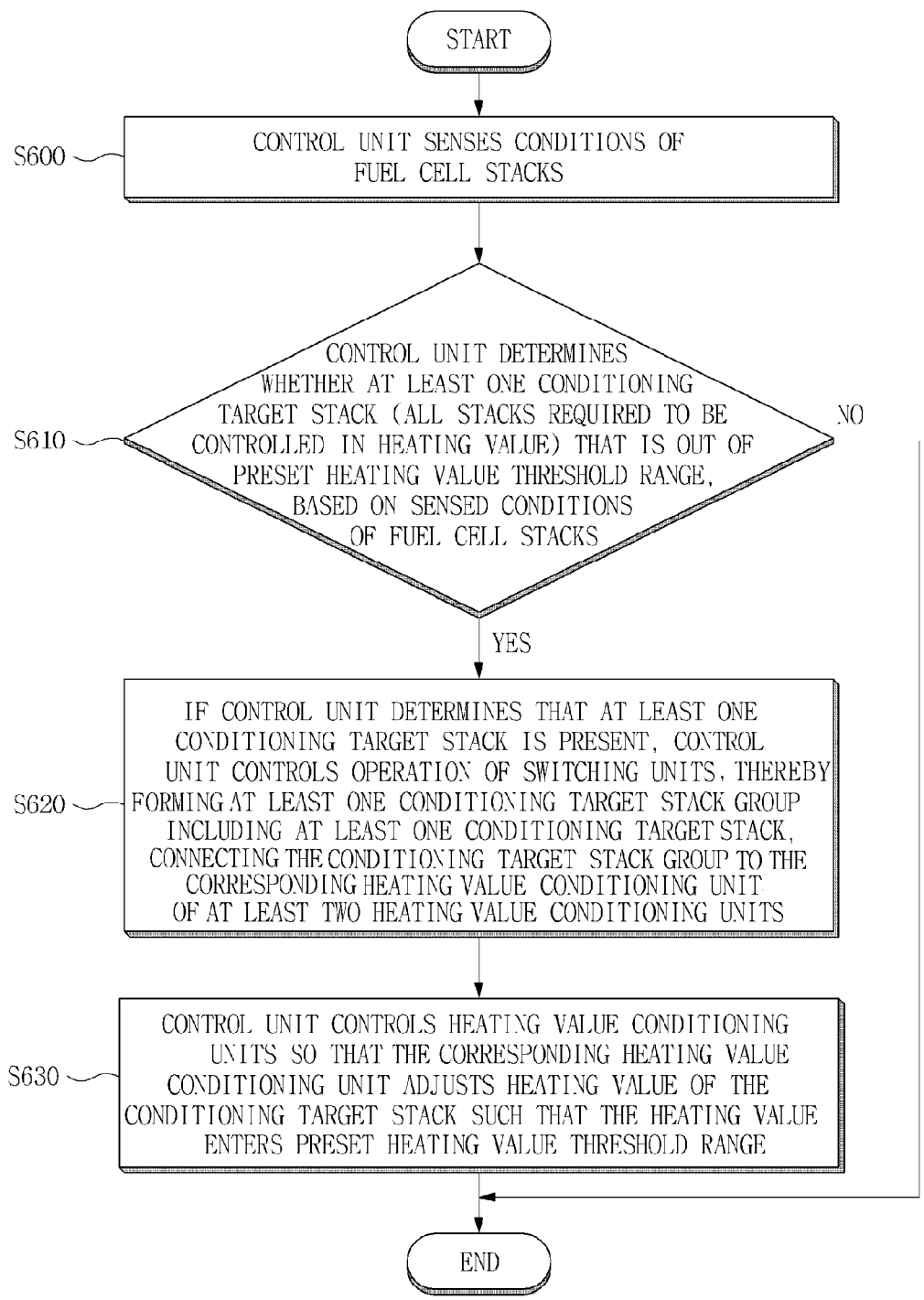
FIG. 6 is a flowchart showing a method of controlling, by a control unit, heating values of the fuel cells, according to an embodiment of the present invention.

FIG. 6 is a flowchart showing a method of controlling, by the control unit, heating values of the fuel cells, according to an embodiment of the present invention.

Referring to FIG. 6, at step S600, the control unit 600 controls the operation of the stack condition sensors to sense conditions of the fuel cell stacks 210, 220, 230 and 240. At step S610, based on the sensed conditions of the fuel cell stacks, the control unit 600 determines whether one or more conditioning target stacks that are out of the preset heating value threshold range, for example, normal fuel cell stacks (210, 220 and 230 of FIG. 3 or 210 and 230 of FIG. 4) or deteriorated fuel cell stacks (240 of FIG. 3 or 220 and 240 of FIG. 4), are present. Here, the term "conditioning target stack" refers to all stacks that are required to be controlled in heating value, regardless of whether it is a normal fuel cell stack or a deteriorated fuel cell stack.

Subsequently, at step S620, if the control unit 600 determines that at least one conditioning target stack is present, the control unit 600 controls the operation of the switching units 100 and 400, thereby forming at least one conditioning target stack group including the at least one conditioning target stack {for example, at least one fuel cell stack group among normal fuel cell stack groups (250 of FIGS. 3C and 4C) or deteriorated fuel cell stack groups (260 of FIGS. 3C and 4C)}, and connecting the conditioning target stack group to the corresponding heating value conditioning unit of the at least two heating value conditioning units 510 and 520.

If, at step S610, the control unit 600 determines that no conditioning target stack is present, the method of controlling the fuel cell heating value is stopped.

At step S630, the control unit 600 controls the heating value conditioning units 510 and 520 so that the corresponding heating value conditioning unit adjusts the heating value of the conditioning target stack such that the heating value enters the preset heating value threshold range. Thereafter, the method of controlling the fuel cell heating value is stopped The methods discussed in this specification can be embodied by a variety of means depending on application examples. For instance, the methods may be embodied in a form of hardware, firmware, software or a combination of them. In an application example accompanying hardware, a control circuit or a control unit may be embodied by one or more application specific integrated circuits (ASICs), digital signal processors (DSPs), field programmable gate arrays (FPGAs), processors, controllers, micro-controllers, microprocessors, electronic devices, other electronic units designed to carry out the functions discussed in this specification, or a combination of them.

As described above, an apparatus for controlling a fuel cell heating value according to the present invention electrically connects fuel cell stacks or fuel cell stack modules to each other and minimizes a deviation between heating values of the fuel cell stacks or fuel cell stack modules, thus preventing acceleration of stack deterioration, rapid stack performance degradation, and a shut down phenomenon. Thereby, the stacks or stack modules can be reliably and efficiently operated.

Furthermore, the apparatus may be configured such that the heating values of the stacks or stack modules can be controlled as needed or arbitrarily to provide stacks or stack modules designed for user's convenience.

Although the embodiments of the present invention have been disclosed for illustrative purposes, it will be appreciated that the present invention is not limited thereto, and those skilled in the art will appreciate that various modifications, additions and substitutions are possible, without departing from the scope and spirit of the invention.

Accordingly, any and all modifications, variations or equivalent arrangements should be considered to be within the scope of the invention, and the detailed scope of the invention will be disclosed by the accompanying claims.

What is claimed is:

1. An apparatus for controlling a heating value of a fuel cell having a plurality of fuel cell stacks mechanically connected to each other, the fuel cell stacks receiving fuel and air, the apparatus comprising:
   a plurality of stack condition sensors sensing conditions of the respective fuel cell stacks; and
   a control unit configured such that, based on conditions of the fuel cell stacks sensed by the stack condition sensors, when at least one conditioning target stack having a heating value that is out of a preset heating value threshold range is sensed, at least one conditioning target stack group including the sensed at least one conditioning target stack is formed, and the at least one conditioning target stack group is connected to the corresponding heating value conditioning unit of at least two heating value conditioning units.

2. The apparatus as set forth in claim 1, wherein the control unit controls the heating value conditioning units so that the heating value conditioning unit connected to the conditioning target stack group adjusts a heating value of the corresponding conditioning target stack group such that the heating value of the conditioning target stack group is within the preset heating value threshold range.

3. The apparatus as set forth in claim 1, further comprising a switching unit connecting at least some of the fuel cell stacks to each other and connecting the connected fuel cell stacks to at least one of the at least two heating value conditioning units,
wherein the switching unit comprises:
a fuel-cell-stack switching unit forming, through on/off operation thereof, the at least one conditioning target stack group including the at least one conditioning target stack; and
a heating-value-conditioning-unit switching unit connecting the at least one conditioning target stack group to the corresponding heating value conditioning unit of the at least two heating value conditioning units.

4. The apparatus as set forth in claim 1, wherein based on conditions of the sensed stacks, when the control unit senses a conditioning target stack having a heating value higher than the preset heating value threshold range, the control unit forms at least one conditioning target stack group including the sensed at least one conditioning target stack, connects the conditioning target stack group to a first heating value conditioning unit of the at least two heating value conditioning units, and controls the connected first heating value conditioning unit using a first control signal of the control unit so that the first heating value conditioning unit conducts a first conditioning operation in repose to the first control signal such that the heating value of the conditioning target stack group reduces and enters the preset heating value threshold range, or
based on the conditions of the sensed stacks, when the control unit senses a conditioning target stack having a heating value lower than the preset heating value threshold range, the control unit forms at least one conditioning target stack group including the sensed at least one conditioning target stack, connects the conditioning target stack group to a second heating value conditioning unit of the at least two heating value conditioning units, and controls the connected second heating value conditioning unit using a second control signal of the control unit so that the second heating value conditioning unit conducts a second conditioning operation in repose to the second control signal such that the heating value of the conditioning target stack group increases and enters the preset heating value threshold range.

5. The apparatus as set forth in claim 4, wherein the control unit controls the first and second heating value conditioning units such that the first and second heating value conditioning units respectively conduct the first and second conditioning operations at a same time.

6. The apparatus as set forth in claim 4, wherein the control unit controls the first and second heating value conditioning units such that the first and second heating value conditioning units respectively conduct the first and second conditioning operations at different times.

7. The apparatus as set forth in claim 1, wherein the heating value conditioning unit controls current of the conditioning target stack.

8. The apparatus as set forth in claim 1, wherein the heating value of the conditioning target stack satisfies a following equation: a heating value=$I \times \Delta V$, using a present operating current ($I$) and a voltage loss ($\Delta V$), the voltage loss ($\Delta V$) being a voltage difference between an open circuit voltage (OCV) or Nernst potential of the conditioning target stack that is measured at an initial stage and a present voltage of the conditioning target stack, or
the heating value of the conditioning target stack is measured and calculated from a temperature of the conditioning target stack that is sensed by the corresponding stack condition sensor.

9. The apparatus as set forth in claim 1, wherein each of the stack condition sensors senses at least one of a current, a voltage and a temperature of the corresponding fuel cell stack and transmits the sensed at least one of the current, the voltage and the temperature to the control unit, and
the control unit senses the conditioning target stack based on the sensed at least one of the current, the voltage and the temperature.

10. An apparatus for controlling a heating value of a fuel cell having a plurality of fuel cell stack modules mechanically connected to each other, each of the fuel cell stack modules comprising at least one fuel cell stack receiving fuel and air, the apparatus comprising:
a plurality of stack module condition sensors sensing conditions of the respective fuel cell stack modules; and
a control unit configured such that, based on conditions of the fuel cell stack modules sensed by the stack module condition sensors, when at least one conditioning target stack module having a heating value that is out of a preset heating value threshold range is sensed, at least one conditioning target stack module group including the sensed at least one conditioning target stack module is formed, and the at least one conditioning target stack module group is connected to the corresponding heating value conditioning unit of at least two heating value conditioning units.

11. The apparatus as set forth in claim 10, wherein the control unit controls the heating value conditioning units so that the heating value conditioning unit connected to the conditioning target stack module group adjusts a heating value of the corresponding conditioning target stack module group such that the heating value of the conditioning target stack module group is within the preset heating value threshold range.

12. The apparatus as set forth in claim 10, further comprising a switching module unit connecting at least some of the fuel cell stack modules to each other and connecting the connected fuel cell stack modules to at least one of the at least two heating value conditioning units,
wherein the switching module unit comprises:
a fuel-cell-stack switching module unit forming, through on/off operation thereof, the at least one conditioning target stack module group including the at least one conditioning target stack module; and
a heating-value-conditioning-unit switching module unit connecting the at least one conditioning target stack module group to the corresponding heating value conditioning unit of the at least two heating value conditioning units.

13. The apparatus as set forth in claim 10, wherein each of the stack module condition sensors senses at least one of a current, a voltage and a temperature of the corresponding fuel cell stack module and transmits the sensed at least one of the current, the voltage and the temperature to the control unit, and
the control unit senses the conditioning target stack module based on the sensed at least one of the current, the voltage and the temperature.

* * * * *